United States Patent
O'Brien et al.

(10) Patent No.: US 7,037,876 B2
(45) Date of Patent: *May 2, 2006

(54) HIGH TEMPERATURE SHIFT CATALYST PREPARED WITH A PURITY IRON PRECURSOR

(75) Inventors: Robert O'Brien, Louisville, KY (US); X. D. Hu, Louisville, KY (US); Richard Tuell, Elizabeth, IN (US); Yeping Cai, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 225 days.

This patent is subject to a terminal disclaimer.

(21) Appl. No.: 10/642,805

(22) Filed: Aug. 18, 2003

(65) Prior Publication Data

US 2004/0077483 A1    Apr. 22, 2004

Related U.S. Application Data

(63) Continuation-in-part of application No. PCT/US02/15310, filed on May 15, 2002.

(51) Int. Cl.
    *B01J 23/745* (2006.01)

(52) U.S. Cl. .............. 502/305; 502/313; 502/316; 502/318; 502/319; 502/325; 502/331; 502/338; 502/345

(58) Field of Classification Search .......... 502/305, 502/313, 316, 318, 319, 325, 331, 338, 345
See application file for complete search history.

(56) References Cited

U.S. PATENT DOCUMENTS

| | | | | |
|---|---|---|---|---|
| 4,598,062 | A | * | 7/1986 | Schneider et al. .......... 502/306 |
| 4,861,745 | A | * | 8/1989 | Huang et al. ............... 502/314 |
| 6,265,451 | B1 | * | 7/2001 | Zhou et al. ................. 518/700 |
| 2004/0009871 | A1 | * | 1/2004 | Hu et al. .................... 502/338 |

* cited by examiner

*Primary Examiner*—Christina Johnson
(74) *Attorney, Agent, or Firm*—Joan L. Simunic

(57) ABSTRACT

A high temperature water gas shift catalyst comprising iron and at least one promoter is prepared via a method which comprises the preparation of a high purity iron precursor and which uses a nominal amount of water in the catalyst production. The catalyst prepared according to the inventive method is more efficient in hydrogen production under the high temperature water gas shift reaction conditions in a fixed bed test than prior art catalysts of similar composition.

16 Claims, 2 Drawing Sheets

HIGH TEMPERATURE SHIFT CATALYST PREPARED WITH A PURITY IRON PRECURSOR

CROSS REFERENCE TO RELATED APPLICATIONS

This application is a continuation in part of PCT Patent Application Ser. No. PCT/US02/15,310 filed on May 15, 2002, currently pending, and incorporated herein in its entirety by reference.

BACKGROUND

The present invention is for a method for producing a catalyst for use in the high temperature shift water-gas shift reaction, and for the catalyst produced by the inventive method. The catalyst of the present invention comprises iron and at least one promoter. The catalyst is prepared via a method which comprises the preparation of a high purity iron precursor and which uses a nominal amount of water in the catalyst production. The catalyst particles prepared with the high purity iron precursor are essentially free of contaminants, and have essentially spherical particle shape and a relatively small particle size distribution range.

Hydrogen is an indispensable component for many petroleum and chemical processes. For example, refineries in the petroleum industry and methanol and ammonia plants in the chemical industry consume considerable quantities of hydrogen for the production of gasoline and fertilizers. Traditionally, the hydrogen for these reactions was produced as a by-product of other chemical reactions. However, as the environmental regulations demand cleaner, renewable and nonpolluting processes and products, most of the hydrogen balances at petroleum refineries are going negative. At the same time, $H_2$ consumption is increasing because $H_2$ is required to decrease the level of aromatics and sulfur in fuels.

Synthesis gas (syngas, a mixture of hydrogen gas and carbon monoxide) represents one of the most important feedstocks for the chemical industry. It is used to synthesize basic chemicals, such as methanol or oxyaldehydes, as well as for the production of ammonia and pure hydrogen. However, synthesis gas produced by steam reforming of hydrocarbons is typically not suitable for industrial applications because the syngas produced is relatively carbon monoxide rich and hydrogen poor.

In commercial operations, a water gas shift (WGS) reaction (Eq. 1) is used to convert carbon monoxide to carbon dioxide.

$$CO+H_2O \rightleftharpoons CO_2+H_2 \quad H=-9.84 \text{ Kcal/mol at } 298° \text{ K} \quad \text{(Eq. 1)}$$

An added benefit of the WGS reaction is that hydrogen is generated concurrently with the carbon monoxide conversion.

The water gas shift reaction is usually carried out in two stages: a high temperature stage, with typical reaction temperatures of about 350° C.–400° C., and a low temperature stage, with typical reaction temperatures of about 180° C.–240° C. While the lower temperature reactions favor more complete carbon monoxide conversion, the higher temperature reactions allow recovery of the heat of reaction at a sufficient temperature level to generate high pressure steam. For maximum efficiency and economy of operation, many plants contain a high temperature reaction unit for bulk carbon monoxide conversion and heat recovery, and a low temperature reaction unit for final carbon monoxide conversion.

The commonly used catalysts for the water gas shift reaction at low temperature (referred to as a low temperature shift or LTS reaction) contain copper oxide, zinc oxide and aluminum oxide. Because these catalysts operate at relatively low temperatures, they generate equilibrium carbon monoxide concentrations of less than about 0.3% in the exit gas stream. However, the performance of the LTS catalyst to effect carbon monoxide conversion and the hydrogen yield gradually decrease during normal operations due to deactivation of the catalyst. This deactivation is caused by poisoning, generally from traces of chloride and sulfur compounds in the feed, or sintering from the hydrothermal environment of the reaction.

Chromium-promoted iron catalysts are normally used in the first stage high temperature reactions (referred to as a high temperature shift or HTS reaction) to effect carbon monoxide conversion at temperatures above about 350° C. and to reduce the CO content to about 3%–4% (see, for example, D. S. Newsom, Catal. Rev., 21, p. 275 (1980)). As is known from the literature, the chromium oxide promoter serves two functions: it enhances catalytic activity and it acts as a heat stabilizer—increasing the heat stability of magnetite, the active form of the catalyst, and preventing unduly rapid deactivation of the catalyst under conditions of technical use. More specifically, a typical composition of high temperature shift catalyst comprises from about 60 wt % to about 95 wt % $Fe_2O_3$, from about 0 wt % to about 20 wt % $Cr_2O_3$, from about 0 wt % to about 10 wt % of CuO and from about 0 wt % to about 10 wt % other active components such as $ZrO_2$, $TiO_2$, $Co_3O_4$, $Al_2O_3$, $SiO_2$ and/or $CeO_2$.

The HTS catalyst is usually made by either co-precipitation of metal salts (nitrate, sulfate, or acetate), thermal decomposition of metal complexes, or impregnation of metal salt onto a carrier. Depending on the preparation conditions (pH, temperature, addition rate and composition), one or several of the mixed iron precursors such as goethite, ferrihydrite, and/or lepidocrocite, may be present. The HTS catalyst is washed to remove foreign ions, and then is dried and calcined at a predetermined temperature to form oxides. With appropriate precursors and preparation conditions, a mixture of goethite and maghemite phases is formed during calcination at 250° C.–600° C. Thermodynamically, hematite is a more stable at higher temperatures. The goethite phase can be directly transformed to hematite at the temperatures higher than 300° C. Likewise, the maghemite phase is gradually converted to hematite at increased temperatures. The presence of both maghemite and hematite in a fresh catalyst precursor are critical to the activity of iron oxide commercial catalyst, and in a typical commercial catalyst calcined under mild temperature, the maghemite to hematite ratio is generally varies from 1 to 0.5.

A hydrothermally stable HTS catalyst is preferably formulated in such a way that the iron is stabilized by other components of the catalyst, such as chromium or aluminum oxide. For example, Cr substitution in an iron oxide lattice in a reduced working catalyst results in the expansion of the tetrahedral sites and the contraction of the octahedral sites, along with the oxidation of some $Fe^{2+}$ to $Fe^{3+}$. The resulting octahedral cations become more covalent in nature. In the presence of significant partial pressures of steam as found in the high temperature water gas shift reaction conditions, chromium oxide migration and/or inclusion of stabilizers into the iron oxide lattice inhibits crystallite growth.

Precipitated iron catalysts are generally regarded as superior high temperature water gas shift catalysts to the other types of iron catalysts described herein. The major disadvantages of the manufacture of precipitated iron catalysts include high cost, the method is labor intensive, and the by products are deleterious to the environment. Iron (ferric or ferrous) sulfate is the preferred iron source of precipitated iron catalysts because of availability and economics. But sulfur contamination from iron sulfate can have a deleterious effect on the activity of the resulting HTS catalyst. Further, the precipitation method tends to result in the formation of very viscous and gelatinous iron hydroxide or iron oxyhydrate precursor. This viscous precursor can be very difficult to filter and wash.

A process to produce iron-based HTS catalysts that reduces or eliminates the washing and filtration steps and has minimal emissions to the environment would be favorable. A logical process from a commercial viewpoint would be to promote, form, dry and calcine a commercially available iron oxide that has high purity and high surface area. Commercial iron oxides are readily available; however, they are usually prepared by treatment of steel with hydrochloric acid or sulfuric acid. These iron oxides contain significant amounts of impurities including chloride and sulfur which makes them unusable as raw materials for HTS catalysts. As is known in the art, the impurities of the commercial iron oxides (red or yellow iron oxides) can be reduced to very low level by the pickling process under very high temperatures. However, because of the extreme conditions of the pickling process, the surface area of the iron oxide is generally less than 10 $m^2$/g making the iron oxide unsuitable for catalyst applications.

SUMMARY OF THE PRESENT INVENTION

A water gas shift catalyst comprising iron and at least one promoter is prepared via a method which comprises the preparation of a high purity iron oxide from iron metal. The catalyst particles prepared with the high purity iron oxide are essentially free of contaminants, particularly halogens, nitrogen and sulfurs, and have an essentially spherical particle shape, a relatively narrow particle size distribution range, and surface areas of up to about 100 $m^2$/g—suitable for various catalyst applications.

The method comprises reacting iron metal with a mild organic acid and air in the presence of a minimal amount of water. The amount of water consumption in this invention is at least 15 times less than that used in a conventional precipitation method and as a result, minimum or no waste water containing sulfate, nitrate or chloride is generated in this process. The resulting iron oxide slurry is then milled and promoters are added. The slurry is spray dried to form the finished catalyst. Because the process uses iron metal, the level of potential contaminants, such as sulfur and chlorine, can be kept to a minimum by starting with clean metal. Further, by starting with iron metal, there are no residual materials which need to be removed by washing the iron oxide filtrate so the amount of waste water is significantly lower than in prior art catalyst preparations. Additionally, because it is not necessary to wash and filter the slurry repeatedly, the production time is shorter than in prior art catalyst preparations.

DETAILED DESCRIPTION OF THE PREFERRED EMBODIMENTS

Figure 1:
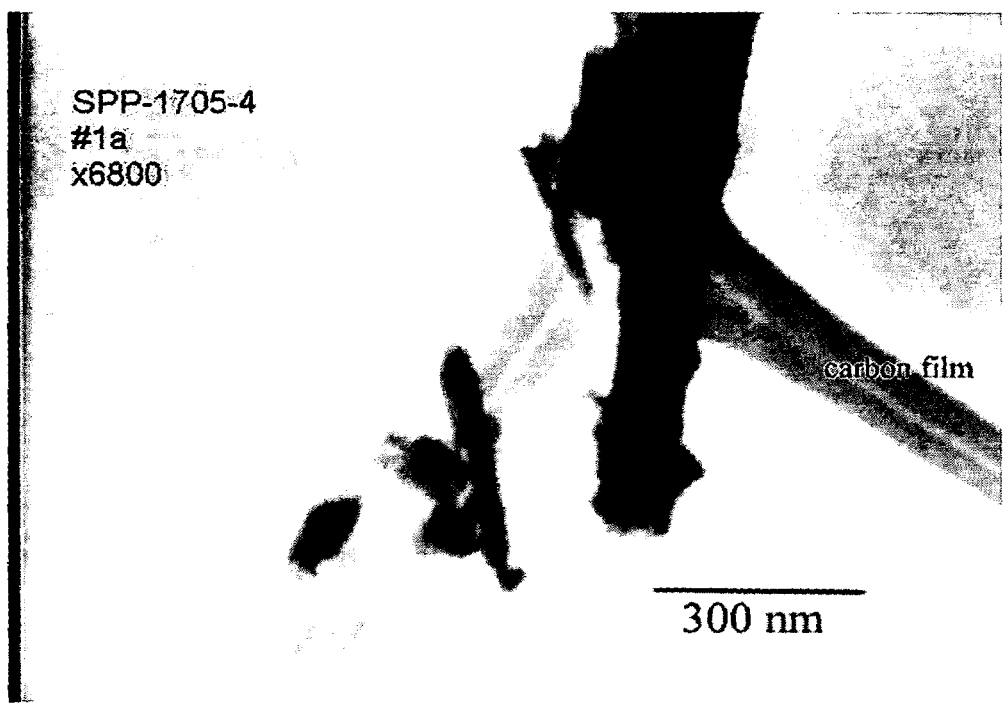
FIG. 1 is a high resolution transmission electron micrograph, magnification 6800×, of an catalyst comprising iron oxide, the catalyst being prepared by the prior art precipitation method as described in Example 1.

The catalyst of the present invention is intended for use in the high temperature water gas shift (HTS) process for hydrogen and syngas generation. The catalyst composition is similar to HTS catalysts of the prior art and includes iron and at least one promoter. However, the process by which the catalyst is prepared is novel and the catalyst of the present invention includes fewer contaminants, such as sulfur and chlorine, and can be produced more efficiently than the prior art HTS catalysts. Specifically, the HTS catalyst of the present invention comprises from about 60 wt % to about 95 wt % $Fe_2O_3$, from about 0 wt % to about 20 wt % $Cr_2O_3$, from about 0 wt % to about 10 wt % CuO and from about 0 wt % to about 10 wt % other active components such as $ZrO_2$, $TiO_2$, $Co_3O_4$, $Al_2O_3$, $SiO_2$ and/or $CeO_2$, and in a preferred composition, the HTS catalyst comprises from about 80 wt % to about 95 wt % iron oxide. The catalyst is prepared via a method which comprises the preparation of a high purity iron oxide from iron metal.

High temperature water gas shift catalysts, particularly the iron catalysts, also commonly include at least one promoter which is added to improve selected properties of the catalyst or to modify the catalyst activity and/or selectivity. However, the addition of a promoter is not required to prepare the catalyst particles having an essentially spherical shape and a relatively narrow particle size distribution. For iron-based catalysts, the prior art teaches that copper, the alkali metals and the alkaline earth metals, such as sodium, potassium, rubidium, cesium, magnesium, calcium, strontium, barium and combinations thereof, are effective promoters. Other metals may be substituted as desired by the user to modify the catalyst properties or to modify the catalyst's thermal and hydrothermal stability. For example, HTS catalysts have been prepared with stabilizing promoters selected from the group consisting of cerium, chromium, iridium, lanthanum, manganese, molybdenum, palladium, platinum, rhenium, rhodium, ruthenium, strontium, tungsten, vanadium, zinc, potassium oxide, rubidium oxide, cesium oxide, magnesium oxide, titanium oxide, zirconium oxide, aluminum oxide silica and other rare earth metals, such as scandium, yttrium, praseodymium, neodymium, promethium, samarium, europium, gadolinium, terbium, dysprosium, holmium, erbium, thulium, ytterbium, lutetium, and combinations thereof. The stabilizing promoters are generally added in smaller concentrations than the iron, and in the present invention, the promoters preferably comprise from about 0.1 wt % to about 40 wt % as oxide, and more preferably comprises from about 1 wt % to about 10 wt % of the total catalyst weight.

In the present invention, although the catalyst composition is similar to that of high temperature water gas shift catalysts of the prior art, the process by which the catalyst is prepared results in a catalyst which is essentially free of contaminants, and which has an essentially spherical particle shape, a relatively narrow particle size distribution range, and a high surface area. Broadly presented, the process for preparing a preferred embodiment of the catalyst of the present invention includes directly treating iron metal with a mild organic acid and air to form an iron oxide slurry, then intensively milling the slurry to a small micron size, then adding one or more promoters to the slurry, and then spray drying the slurry with a wheel atomizer. Water is added to the process only as needed to allow for mixing of the materials. (As used herein, the term "contaminants" refers to elements or compounds which are known in the art to deleteriously affect the performance of the HTS catalyst. Some commonly recognized contaminants are sulfur and chlorine.)

More specifically, to prepare the high temperature water gas shift catalyst of the present invention, iron metal is reacted with a mild organic acid in aqueous media at ambient conditions, and the mixture is then aerated. The iron metal may be a powder, granule, sphere, chip or other form having an average diameter of from about 1μ to about 500μ. In one embodiment, the iron metal is in micro-spheroidal form with an average diameter of from about 40μ to about 150μ. Further, the iron metal should be essentially contaminant-free, although traces of carbon, manganese, nickel, copper, silicon and combinations thereof, may be present. (As used herein, "traces" is defined as less than about 1.5 wt % for all the elements combined.) The organic acid is preferably a carboxylic acid having at least one carboxylic acid group with a $pK_a$ at ambient temperature of from about 0.5 to about 6. For example, formic acid, acetic acid, glycolic acid, oxalic acid, pyruvic acid, malonic acid and propionic acid may be used in the reaction.

The organic acid is added to deionized water with agitation to form an acid solution. At ambient temperature and while maintaining the agitation or mixing, the iron metal is slowly added to the acid solution. As the iron reacts with the acid, the reaction temperature increases, but the rate of addition should be sufficiently slow that the temperature does not exceed about 100° F. It is believed that when iron metal is added to the organic acid solution, the iron is oxidized by the acid and hydrogen gas ($H_2$) is produced. The hydrogen gas can be diluted in a vent with air to a concentration of less than about 4%, i.e. below the explosion limit, or it can be sent to an afterburner to recover the heat for use in drying or calcination.

After the iron metal is mixed into the acid solution, an additional oxidizing agent, such as air, compressed air, oxygen, hydrogen peroxide, an organic peroxide, ozone or a combination thereof, is added to the solution. In one embodiment the oxidizing agent is compressed air which is forced through the solution via a stainless steel air sparger mounted within a mix tank, however, a variety of other means as are known in the art may be used to bubble air through the iron/acid solution. The air flow is continued and the reaction temperature is held at less than about 100° F. until essentially all the free iron is consumed and an iron slurry is formed. The slurry is believed to comprise iron oxide hydrate, iron oxide, iron hydroxide, iron oxyhydroxide or a combination thereof. Total iron consumption time can range from about 24 hours to about 48 hours, or longer depending on the iron source. During the course of the reaction, the slurry color changes from gray to brown. Typically, the color change will be evident from about 45 minutes to about 6 hours after the air flow is started. Unreacted iron can be detected by X-ray diffraction patterns.

The iron slurry is milled to a small particle size, such as a median particle size of less than about 40 microns, preferably a particle size of less than about 10 microns. In the examples presented herein, a Netzsch mill with SEPR, ER 120A 0.8/1.25 mm ceramic beads is used. However, several different milling techniques are known in the art and may be used in place of the Netzsch mill.

The iron content in the slurry is determined using standard techniques known in the art, and promoters are added to the slurry. The specific promoters added and concentration at which the promoters are added can vary depending on the application. If the promoters are added as crystals, the crystals may be dissolved in a small amount of water before addition to the slurry. After the addition of the promoters, the product slurry should have a solids content of from about 10% to about 40%.

The slurry is then spray dried with a wheel atomizer. The inlet temperature is set to about 500° F., and the outlet temperature is maintained at about 300° F. A median particle size of from about 50 microns to 80 microns (wheel speed of about 13,000 rpm) is preferred. After spray drying, the surface area of the catalyst is from about 10 $m^2/g$ to about 40 $m^2/g$.

The dried iron oxide catalyst is then mixed with chromic acid flakes or with a similar material that will provide chromium oxide to the finished catalyst. The chromium comprising spray dried catalyst is then calcined and screened to remove large particles. After calcining at about 400° C. for about 4 hours, the catalyst has a surface area of from about 10 $m^2/g$ to about 80 $m^2/g$. The spray dried catalyst has an essentially spherical shape.

The following examples illustrate and explain the present invention, but are not to be taken as limiting the present invention in any regard. Example 1 describes the preparation of a high temperature water gas shift catalyst using a conventional precipitation method. Examples 2–8 describe preparations of high temperature water gas shift catalysts using the minimal effluent method in accordance with the present invention.

EXAMPLE 1

A comparative sample of a high temperature water gas shift catalyst is prepared by a prior art precipitation method as follows:

About 2000 grams of 50% of sodium hydroxide is first diluted with about 14 liter of deionized water in a precipitation vessel. About 8298 grams of iron sulfate, or about 9828 grams of iron nitrate mixed with about 775 grams of sodium chromate and 243 grams of copper sulfate, is slowly pumped in under vigorous agitation and with air sparging. A constant precipitation temperature is maintained at 45° C. until the pH reaches a value of about 7.5 and the excess caustic is between 0.8–1.2 g/100 cc. The total precipitation time takes about 60 minutes. With air sparging continuing, the precipitation tank is maintained at about 45° C. for approximately 2 hours to age the catalyst precursor. The temperature is then raised to approximately 65° C., and when 65° C. is reached the slurry is transferred to a thickening tank, where air sparging is maintained until a minimum of six hours have transpired during heat-up, precipitation and thickening processes. The washing and thickening steps are repeated until the sodium content reaches <1000 ppm and the sulfur content reaches <300 ppm. The filtercake is then dried at approximately 180° C. for about 12 hours and is then calcined at about 400° C. to about 600° C. for 12 hours. The resultant catalyst has a chemical composition of 90 wt % $Fe_2O_3$, 7.5 wt % $Cr_2O_3$, 2.5 wt % CuO, 0.024 wt % S, and has a surface area of 36 $m^2/g$.

EXAMPLE 2

A sample of a high temperature water gas shift catalyst is prepared by the inventive method presented herein as follows:

A stainless steel air sparger is fitted into the bottom of a 50 gallon Nalgene drum. About 36 gallons of deionized water and about 16.5 pounds of formic acid (90%, commercially available through Specialty Chemical Co. LCC, Cleveland, Tenn., USA) is added to the drum and thoroughly mixed. About 40 pounds of iron powder (commercially available from Pyron, Niagara Falls, N.Y., USA and designated by product code AC-325) is added to the formic acid solution with mixing. The iron powder is added slowly enough to maintain a reaction temperature of less than about 120° F., and preferably less than about 100° F.

After the iron powder is added and a slurry has formed, compressed air is passed through the sparger. The air flow is continued and the reaction temperature is held at about 100° F. until essentially all the free iron is consumed, or for about 24 hours. Unreacted iron can be detected by XRD.

The iron slurry is milled through a Netzsch mill with SEPR, ER 120A 0.8/1.25 mm ceramic beads to a particle size with a D50 of less than about 2 μm. The iron content in the slurry is determined using standard techniques known in the art, and promoters are added to the slurry. The slurry is then spray dried with a wheel atomizer (APV Anhydro Spray Drier). The inlet temperature is set to about 500° F., and the outlet temperature is maintained at about 300° F.

The dried iron oxide powder is then mixed with chromic acid flakes (Oxychem) so that the content of $Cr_2O_3$ in final catalyst is 8%. The mixture is calcined at 400° C. for 4 hours. The resultant catalyst has a chemical composition of 92 wt % $Fe_2O_3$, 8 wt % $Cr_2O_3$, <0.03 wt % S, and has a surface area of 26 m²/g.

EXAMPLE 3

A sample of a HTS catalyst is prepared by the inventive method presented in Example 2 except the iron powder AC-325 is replaced by Höganäs AB (Höganäs, Sweden) ASC-300, and the aeration time is increased to about 48 hours.

EXAMPLE 4

A sample of a HTS catalyst is prepared by the inventive method presented in Example 2 except the iron powder AC-325 is replaced by Höganäs ASC-300, and the aeration time is increased to about 48 hours.

EXAMPLE 5

A sample of a HTS catalyst is prepared by the inventive method presented in Example 2 except the formic acid is replaced by acetic acid, and the aeration time is increased to about 30 hours.

EXAMPLE 6

A sample of a HTS catalyst is prepared by the inventive method presented in Example 2 except the formic acid is replaced by oxalic acid, and the aeration time is increased to about 36 hours.

EXAMPLE 7

A sample of a HTS catalyst is prepared by the inventive method presented in Example 2 except the formic acid is replaced by pyruvic acid, and the aeration time is increased to about 36 hours.

EXAMPLE 8

A sample of a HTS catalyst is prepared by the inventive method presented in Example 2 except the formic acid is replaced by glycolic acid, and the aeration time is increased to about 32 hours.

EXAMPLE 9

A sample of a HTS catalyst is prepared by the inventive method presented in Example 2 except the formic acid is replaced by propionic acid, and the aeration time is increased to about 37 hours.

As previously noted, the amount of water used in the present invention is significantly less than the amount used in a conventional precipitation method. This can be demonstrated by comparing, for example, the amount of water used in Example 1 (precipitation method) and Example 2 (inventive method).

Figure 2:
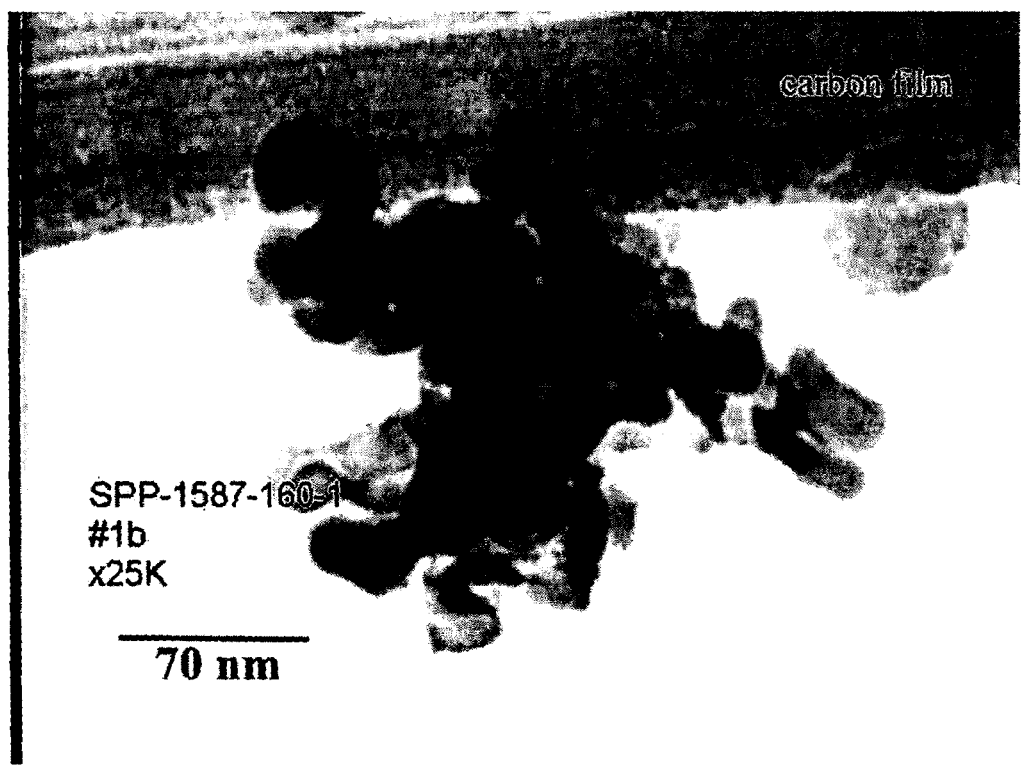
FIG. 2 is a high resolution transmission electron micrograph, magnification 25,000×, of an catalyst comprising iron oxide, the catalyst being prepared by the method in accordance with the present development as described in Example 2.

FIGS. 1 and 2 are transmission electron micrographs of catalyst prepared as described in Examples 1 and 2 respectively. As is known in the art, performance properties of a catalyst are related to its crystalline structure and morphology. As shown in FIG. 2, the catalyst prepared from iron powder is composed of nano-clusters instead of needle-like structure as seen in FIG. 1.

Figure 3:
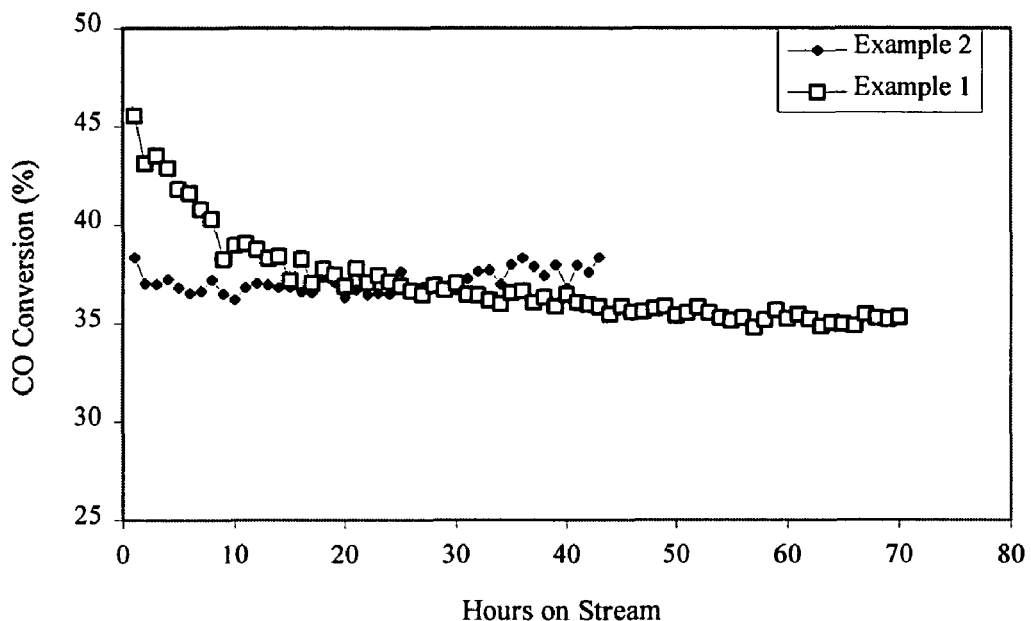
FIG. 3 is a graph depicting the CO conversion in a micro-reactor using the catalysts of Example 1 and of Example 2.

The catalysts of Example 1 and Example 2 are compared for % CO conversion using a micro-reactor and a fixed bed reactor for whole particles. For the micro-reactor, the catalysts are crushed and sieved into 60×80 mesh prior to loading. The catalyst activity is then measured with a feed stream heated to about 371° C. under 1 atmospheric pressure, and containing about 12.8% carbon monoxide, 7.8% carbon dioxide, 23.2% nitrogen and the balance hydrogen. The gas mixture is passed over the catalysts with a steam to dry gas ratio of 0.5. As shown in FIG. 3, in the microreactor the catalyst prepared according to the inventive method is comparable the prior art catalyst.

Figure 4:
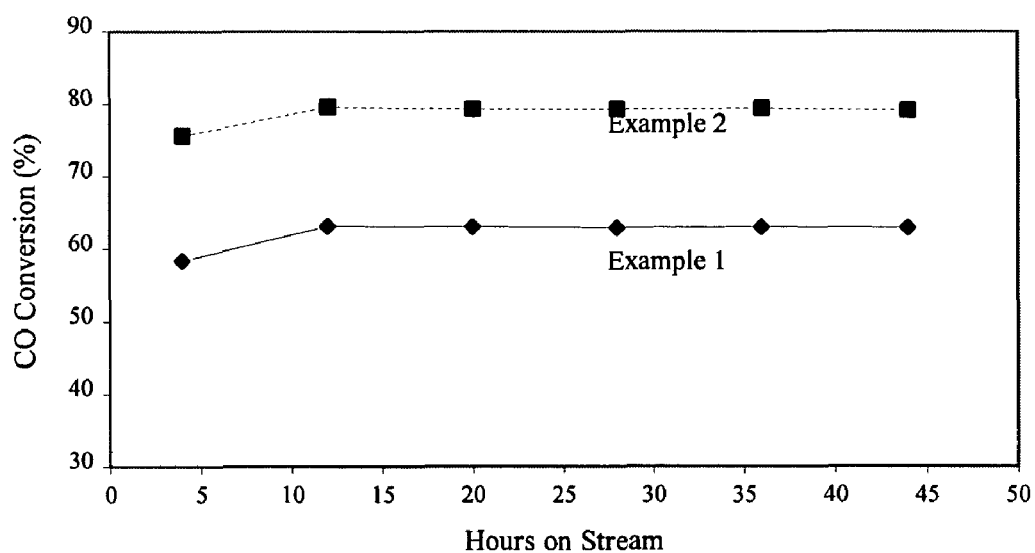
FIG. 4 is a graph depicting the CO conversion in a fixed bed reactor using the catalysts of Example 1 and of Example 2.

For the fixed bed reactor, the catalysts are loaded as whole particles measured at 6×6 mm. The catalyst activity is then measured with a feed stream heated to about 371° C. with the reactor pressurized to about 420 psig. The feed stream contains about 12.8% carbon monoxide, 7.8% carbon dioxide, 23.2% nitrogen and the balance hydrogen. The gas mixture is passed over the catalysts with a steam to dry gas ratio of 0.5. As shown in FIG. 4, in the fixed bed reactor the catalyst prepared according to the inventive method is more efficient than the prior art catalyst.

The catalyst of the present invention is intended for use in the high temperature water gas shift reaction and has a composition is similar to HTS catalysts of the prior art. However, the process by which the catalyst is prepared uses less water, generates less waste water, is more efficient, and produces a finished product essentially free from contaminants and having an essentially spherical particle shape and relatively small particle size distribution range. It is understood that the composition of the catalyst and the specific processing conditions may be varied without exceeding the scope of this development.

We therefore claim:

1. A method of making a catalyst for the production of hydrogen, said catalyst comprising from about 60 wt % to about 95 wt % $Fe_2O_3$, and from about 0.1 wt % to about 20 wt % chromium in the form of the oxide $Cr_2O_3$, and said method comprising:

a) preparing an aqueous organic acid solution, wherein said organic acid is a carboxylic acid having at least one carboxylic acid group with a pK, at ambient temperature of from about 0.5 to about 6;
b) adding iron metal to said acid solution;
c) forcing an oxidizing agent through said acid solution until said iron metal is consumed and an iron slurry is formed;
d) milling said iron slurry to a particle size with a D50 of less than about 2 microns;
e) adding at least one promoter to said milled iron slurry to form a product slurry, said promoter being added at a concentration such that said product slurry has a solids content of from about 10% to about 40% inclusive of said promoter;
f) drying said slurry to form particles;
g) mixing in chromic acid flakes to provide up to about 20 wt % $Cr_2O_3$ to the finished catalyst; and
g) calcining said particles to form said catalyst.

2. The method of claim 1 wherein said organic acid is selected from the group consisting of formic acid, acetic acid, glycolic acid, oxalic acid, pyruvic acid, malonic acid and propionic acid, and a combination thereof.

3. The method of claim 1 wherein said iron metal is a powder, granule, sphere, chip or other form having an average diameter of from about 1μ to about 500μ.

4. The method of claim 1 wherein said promoter is selected from the group consisting of cerium, chromium, iridium, lanthanum, manganese, molybdenum, palladium, platinum, rhenium, rhodium, ruthenium, strontium, tungsten, vanadium, zinc, potassium oxide, rubidium oxide, cesium oxide, magnesium oxide, titanium oxide, zirconium oxide, aluminum oxide, silica, scandium, yttrium, praseodymium, neodymium, promethium, samarium, europium, gadolinium, terbium, dysprosium, holmium, erbium, thulium, ytterbium, lutetium, other rare earth metals and combinations thereof.

5. The method of claim 1 wherein said slurry is spray dried with a wheel atomizer.

6. The method of claim 1 wherein said catalyst comprises from about 80 wt % to about 95 wt % iron oxide.

7. The method of claim 1 wherein said catalyst has an essentially spherical particle shape and relatively small particle size distribution range.

8. The method of claim 1 wherein said oxidizing agent is air, compressed air, oxygen, hydrogen peroxide, an organic peroxide, ozone and a combination thereof.

9. The method of claim 1 wherein said catalyst further comprises from about 0 wt % to about 10 wt % of a component selected from the group consisting of CuO, $ZrO_2$, $TiO_2$, $Co_3O_4$, $Al_2O_3$, $SiO_2$ and $CeO_2$, and said component is added to said milled iron slurry with said promoter.

10. A method of making a catalyst for the production of hydrogen, said catalyst comprising from about 60 wt % to about 95 wt % $Fe_2O_3$, from about 0.1 wt % to about 20 wt % chromium in the form of the oxide $Cr_2O_3$, and up to about 10 wt % CuO, and said method comprising:

a) preparing an aqueous organic acid solution, wherein said organic acid is a carboxylic acid having at least one carboxylic acid group with a pK, at ambient temperature of from about 0.5 to about 6;
b) adding an iron source to said acid solution, wherein said iron source is an iron metal powder, granule, sphere, chip or other form having an average diameter of from about 1μ to about 500μ;
c) forcing an oxidizing agent through said acid solution until said iron source is consumed and an iron slurry is formed;
d) milling said iron slurry to a particle size with a D50 of less than about 2 microns;
e) adding said CuO and, optionally, at least one promoter, to said milled iron slurry to form a product slurry, said CuO and optional promoter being added at a concentration such that said product slurry has a solids content of from about 10% to about 40% inclusive of said promoter;
f) drying said slurry to form particles;
g) mixing in chromic acid flakes to provide up to about 20 wt % $Cr_2O_3$ to the finished catalyst; and
h) calcining said particles to form said catalyst.

11. The method of claim 10 wherein said milled slurry is spray dried with a wheel atomizer.

12. The method of claim 10 wherein said iron slurry has a solids content of from about 10% to about 40%.

13. The method of claim 10 wherein said organic acid solution is prepared from water and an acid selected from the group consisting of formic acid, acetic acid, glycolic acid, oxalic acid, pyruvic acid, malonic acid and propionic acid, and a combination thereof.

14. The method of claim 10 wherein said oxidizing agent is air, compressed air, oxygen, hydrogen peroxide, an organic peroxide, ozone and a combination thereof.

15. The method of claim 10 wherein said promoter is selected from the group consisting of cerium, chromium, iridium, lanthanum, manganese, molybdenum, palladium, platinum, rhenium, rhodium, ruthenium, strontium, tungsten, vanadium, zinc, potassium oxide, rubidium oxide, cesium oxide, magnesium oxide, titanium oxide, zirconium oxide, aluminum oxide, silica, scandium, yttrium, praseodymium, neodymium, promethium, samarium, europium, gadolinium, terbium, dysprosium, holmium, erbium, thulium, ytterbium, lutetium, other rare earth metals and combinations thereof.

16. The method of claim 10 wherein said catalyst further comprises from about 0 wt % to about 10 wt % of a component selected from the group consisting of $ZrO_2$, $TiO_2$, $Co_3O_4$, $Al_2O_3$, $SiO_2$ and $CeO_2$, and said component is added to said milled iron slurry with said promoter.

* * * * *